June 23, 1959 L. W. WARSAP ET AL 2,891,427
MACHINE FOR DRILLING AND PRECISION COUNTERSINKING
Filed Jan. 17, 1955 2 Sheets-Sheet 1

INVENTORS:
Leo W. Warsap
Burdette A. Muller
Eldon T. Lillibridge
By Hubert E. Metcalf
Their Patent Attorneys June 23, 1959 L. W. WARSAP ET AL 2,891,427
MACHINE FOR DRILLING AND PRECISION COUNTERSINKING
Filed Jan. 17, 1955 2 Sheets-Sheet 2

INVENTORS:
Leo W. Warsap
Burdette A. Muller
Eldon T. Lillibridge

By Herbert E. Metcalf
Their Patent Attorney ure # United States Patent Office 2,891,427
Patented June 23, 1959

2,891,427
MACHINE FOR DRILLING AND PRECISION COUNTERSINKING

Leo W. Warsap, Hermosa Beach, and Burdette A. Muller and Eldon T. Lillibridge, Los Angeles, Calif., assignors to Northrop Corporation, a corporation of California Application January 17, 1955, Serial No. 482,202

9 Claims. (Cl. 77—55)

This invention has to do with machine tools and more particularly with a support for a precision drilling and countersinking instrument.

Heretofore it has been difficult to simultaneously drill and countersink material formed in a compound curve, with great accuracy, without the effort of skilled and experienced workmen. Further, even with the knowledge of skilled labor available, the percent of accuracy was low and the rejection of work completed high. This fact measured in man hours expended and wasted plus cost of materials used and necessarily discarded brought the cost of an acceptable unit to a prohibitive level.

The principal object of this invention is to provide a support for a precision drilling and countersinking instrument that will enable an unskilled operator of the said instrument to perform precision work on materials formed in a compound curve with the maximum of effectiveness and a minimum of rejections.

Another object of this invention is to provide a support for a precision drilling and countersinking instrument that will enable the latter to be inclined in any direction in order that material formed in a compound curve may be simultaneously drilled and countersunk with great accuracy and within close tolerances.

A yet further object of this invention is to provide a support for a precision drilling and countersinking instrument that is simple in design, and readily and economically manufactured.

Figure 1:
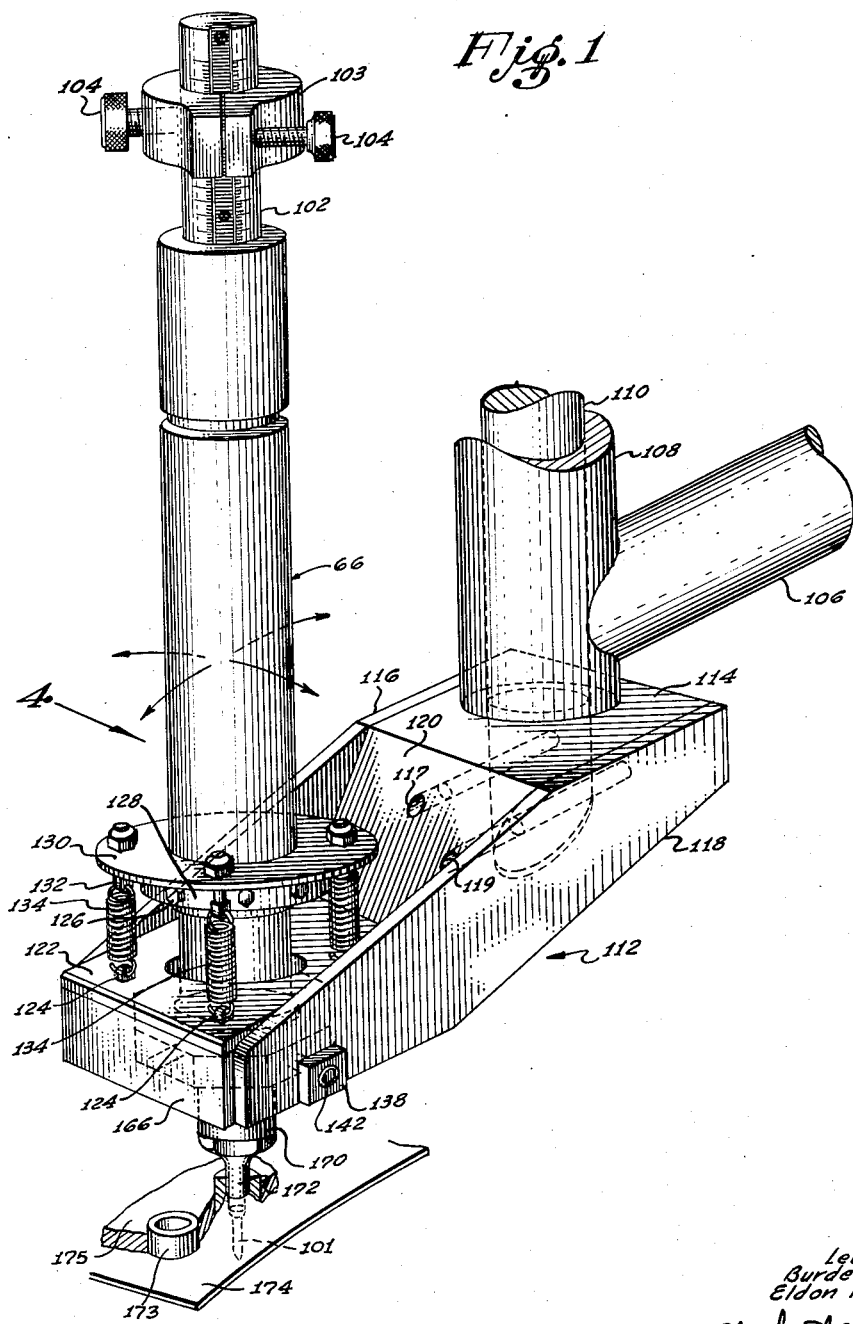
Figure 1 is a fragmentary, perspective view of the drilling instrument and support therefor.
Figure 2:
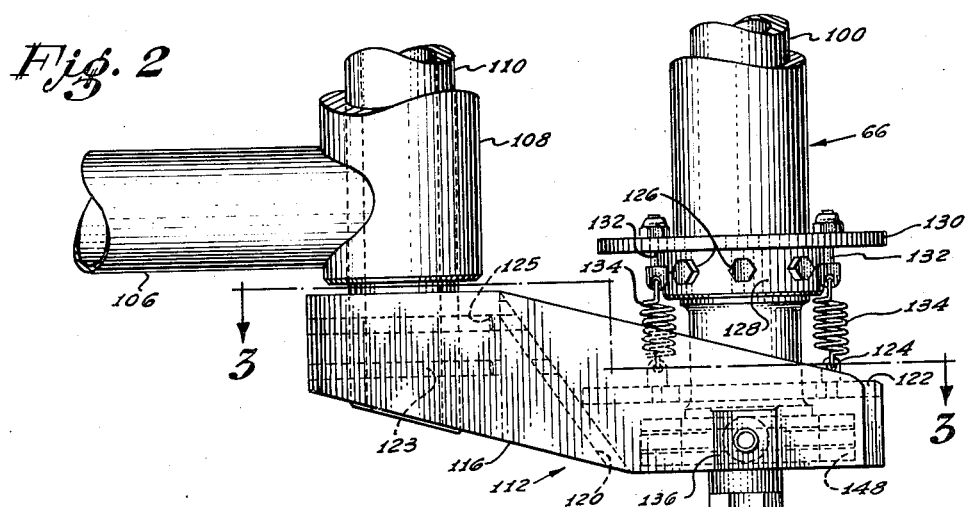
Figure 2 is a fragmentary, side elevation view taken on Figure 1 looking in the direction of the arrow identified by 2; certain structure being shown in phantom line.

Referring to the drawings for a detailed description of the present invention, an air drill 66 has a reciprocating, air actuated shaft 100 extending therethrough with a drill and countersink tool 101 attached thereto. The free end of the shaft 100 has a graduated micrometer 102 thereon and a locking ring 103 thereabout; the latter being adjusted into a shaft stopping position by screws 104.

The machine tool is a pedestal base type having radial arms 106 thereon, one of which is shown. Spanning the distance between the arms 106 and connecting the same is a hollow column 108. Extending through and rotatable in the column 108 is an elongated shaft 110 having rigidly secured thereto, in order to support the air drill 66, a gimbal support broadly designated 112.

Figure 3:
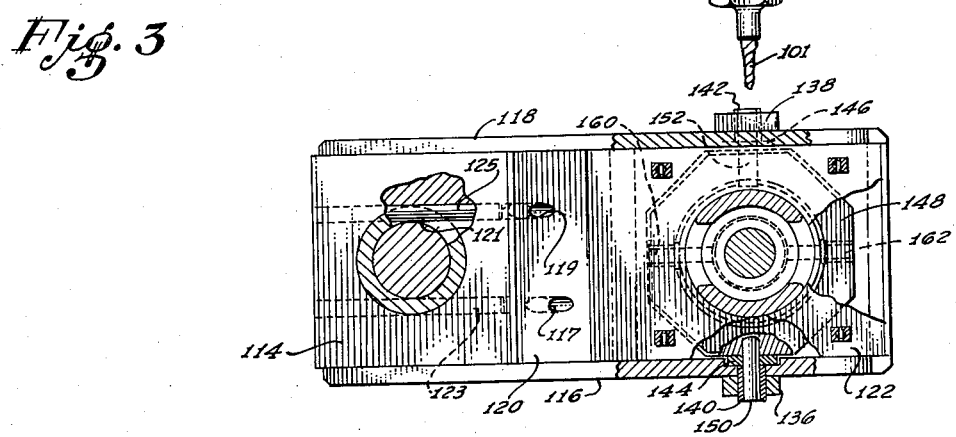
Figure 3 is a fragmentary, cross-sectional view taken on line 3—3 in Figure 2 looking in the direction indicated; certain parts being broken away for purposes of obtaining clarity.
Figure 4:
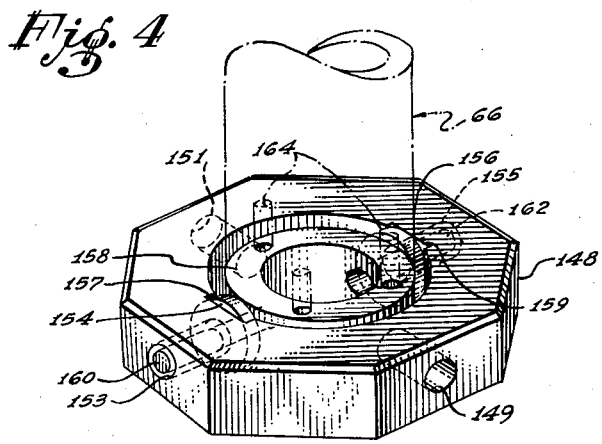
Figure 4 is a perspective view of the pivotal rings that are mounted in the support and upon which the drill, shown in dotted lines for purposes of orientation, is supported.

The support 112 is secured to the shaft 110 by a block 114 being pressed thereon. Welded or otherwise secured to the block are a pair of spaced apart plates 116 and 118. Connecting the plates and secured thereto as well as to the block is an inclined-from-the-vertical torque resisting plate 120. When the block is pressed onto the shaft 110 and the plate 120 is secured thereto as well as to plates 116 and 118, a pair of holes 117 and 119 are drilled through the block 114 and plate 120 tangent to longitudinal axis of the shaft in the manner illustrated in Figure 3 of the drawings. Further, drilling of the holes through the block 114 and plate 120 while in place on the shaft 110 results in a groove 121 being drilled in the shaft in the location. Dowel pins 123 and 125 are then inserted into the holes and grooves and the result is a rigid structure that resists movement in any direction.

Also welded or otherwise secured to the plates 116 and 118 and connecting the same is a plate 122; the latter being also secured to plate 120.

Secured to plate 122 through openings therein are a plurality of equally spaced eye bolts 124.

Removably attached to the air drill 66 by a plurality of bolts 126, and spaced from plate 122, is a collar 128 having a circular flange 130 thereon. A plurality of equally spaced openings extend therethrough through which extend eye bolts 132 that are in linear alignment with the eye bolts 124 on plate 122. Interconnecting the flange 130 and plate 122 are springs 134 that are connected to the eye bolts 124 and 132 respectively. The springs are maintained under compression at all times and continuously support and urge the air drill to a vertical position or a position generally perpendicular to the material worked upon. The springs are located between the center of gravity of the air drill 66 and the support 112.

Welded or otherwise secured to each plate 116 and 118 in diametrically opposed relationship is a bearing support 136 and 138 having a central opening therein that registers with an opening in the aforementioned plates 116 and 118. Extending through each opening is a bearing-bushing 140 and 142. Each plate, in opposed relationship to said support 136 and 138, is cut away to receive a washer 144 and 146 that is secured to an octogonal ring 148. Ring 148 has a pair of opposed openings 149 and 151 therein that register with the openings in the washers 144 and 146, and bearing-bushings 140 and 142. A dowel pin 150 and 152 is pressed into each opening in the ring 148 and extends outwardly through the washers 144 and 146 and bearing-bushings 140 and 142. The dowel pins 150 and 152 are free to rotate in the bearing-bushings 140 and 142 and as a result the ring 148 is free to rotate about the axis of the dowel pins 150 and 152.

The ring 148 has a pair of openings 153 and 155 drilled therein transverse to the axis of rotation of dowel pins 150 and 152. Also plate 148 has a cut away portion 157 and 159 therein to receive washers 154 and 156. Disposed within ring 148 and spaced from the inner peripheral edge thereof by washers 154 and 156 is a circular ring 158 having openings therein that register with the openings 153 and 155 in ring 148. Extending through openings 153 and 155, and rotatable therewithin, are dowel pins 160 and 162. Dowel pins 160 and 162 extend through washers 154 and 156 and are pressed into the opening in ring 158. By virtue of dowel pins 160 and 162 ring 158 is permitted to rotate about their axes.

The air drill 66 is supported upon and secured to ring 158 by bolts 164.

Secured to plates 116, 118 and 122 in opposed relation to block 114 is a plate 166.

Removably secured to the air drill 66 is a hollow drill guide 170 having a square ended projection 172 thereon.

The free end of the projection 172 passes through bushings 173 of a template 175 and indexes on the material 174 to be drilled and by virtue of this fact close tolerance accuracy is obtained.

In the event that the material 174 is formed into a simple or compound curve, the square end of the projection is made to completely contact the same. As a result of this complete contact the drill 66 is caused to be inclined in one direction or the other as indicated in Figure 1 of the drawings. It may now be determined that the drill 66 is always perpendicular to the material 174 being drilled and countersunk.

The operation of the gimbal mounting is as follows:

The locking ring 103 is adjusted on the micrometer 102 to limit the downward path of travel of the shaft 100, having the drill and countersink 101 attached thereto, to the predetermined distance.

The material to be drilled is presumed to be formed in a compound curve. Therefore the projection 172 being attached to air drill 66 will tend to incline the latter to conform to the angle of curvature in the manner previously described. The air drill 66 being supported on the ring 158 will incline in the direction of the axis of rotation of dowel pins 160 and 162 or in the event that the curvature is in opposition to the aforementioned axis of rotation the air drill 66 will be inclined in the direction of the axis of rotation of dowel pins 150 and 152. The effect of the two axes of rotation is that a universal joint is established that will permit the air drill 66 to be inclined in any direction from the vertical.

When the projection 172 is indexed on the material to be drilled and countersunk, the shaft 100 is lowered, bringing the drill per se into contact with the material. The downward path of travel of the shaft 100 is limited by locking ring 103 thereon. Therefore the exact depth of the countersink and drilling is obtained. On completion of drilling and countersinking, the drill is withdrawn from the material and the shaft 100 raised. The projection is also raised from the material.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and support; resilient means interconnecting said elements for urging said instrument to a position perpendicular to said frame; and pivotal means on said frame and connected to said instrument to enable the latter to pivot in relation to the curvature of the material to be drilled and countersunk.

2. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elements for urging said instrument to a position perpendicular to said frame; pivotal means on said frame and connected to said instrument to enable the latter to pivot in relation to the curvature of the material to be drilled and countersunk; and means on said instrument for limiting the downward path of travel thereof.

3. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elements for urging said instrument to a position perpendicular to said frame; pivotal means on said frame and connected to said instrument to enable the latter to pivot in relation to the curvature of the material to be drilled and countersunk; and means on the instrument for indexing the same with reference to the material to be drilled.

4. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elements for urging said instrument to a position perpendicular to said frame; and pivotal means on said frame and connected to said instrument to enable the latter to pivot in relation to the curvature of the material to be drilled and countersunk; said frame including a torque resisting element.

5. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elements for urging said instrument to a position perpendicular to said frame; and a pair of pivotal rings secured to said frame, one of which supports said instrument to enable the latter to pivot in relation to the curvature of the material to be drilled and countersunk.

6. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elements for urging said instrument to a position perpendicular to said support; a pair of pivotal rings secured to said frame, one of which supports said instrument to enable the latter to pivot in relation to the curvature of the material to be drilled and countersunk; and means on said instrument for limiting the downward path of travel thereof.

7. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elments for urging said instrument to a position perpendicular to said support; a pair of pivotal rings secured to said frame, one of which supports said instrument to enable the latter to pivot in relation to the curvature of the material to be drilled and countersunk; and means on the instrument for indexing the same with reference to the material to be drilled.

8. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elements for urging said instrument to a position perpendicular to said frame; and a pair of pivotal rings secured to said frame, one of which supports said instrument to enable the latter to pivot in relation to the curvature of the material to be drilled and countersunk; said frame including a torque resisting element.

9. In a pedestal base type machine for drilling and precision countersinking materials formed in a compound curve, having radial arms thereon, a shaft rotatably secured to said arms, a mounting comprising a reciprocal drilling and countersinking instrument; a frame on said shaft; spaced elements on said instrument and frame; resilient means interconnecting said elements that urge said instrument to a position perpendicular to said frame; and pivotal means on said frame and connected to said instrument to enable the latter to pivot in relation to the curvature of the material to be drilled and countersunk; said pivotal means including a pair of rings.

References Cited in the file of this patent
UNITED STATES PATENTS

| | | |
|---|---|---|
| 324,759 | Elliott | Aug. 18, 1885 |
| 1,502,727 | Lavoie | July 29, 1924 |
| 1,615,774 | Russell | Jan. 25, 1927 |
| 1,770,721 | Willis | July 15, 1930 |
| 2,300,247 | Dion | Oct. 27, 1942 |

FOREIGN PATENTS

| | | |
|---|---|---|
| 52,508 | Sweden | May 26, 1920 |
| 727,253 | Germany | July 15, 1930 |